United States Patent
Bok et al.

(10) Patent No.: US 11,389,775 B2
(45) Date of Patent: Jul. 19, 2022

(54) STIRRER COMPRISING TWO ROTATING SHAFTS HAVING INTERSECTING STIRRING BLADES CAPABLE OF ROTATING SYMMETRICALLY AND ROTATING IN IDENTICAL DIRECTION AND STIRRING METHOD

(71) Applicants: Metatek Co., Ltd., Chungcheongnam-Do (KR); Young Ho Bok, Suwon-si (KR); So Yeon Bok, Suwon-si (KR)

(72) Inventors: Young Ho Bok, Suwon-si (KR); So Yeon Bok, Suwon-si (KR)

(73) Assignees: Young Ho Bok, Suwon-si (KR); So Yeon Bok, Suwon-si (KR)

( * ) Notice: Subject to any disclaimer, the term of this patent is extended or adjusted under 35 U.S.C. 154(b) by 322 days.

(21) Appl. No.: 16/095,487

(22) PCT Filed: Mar. 5, 2016

(86) PCT No.: PCT/KR2016/004673
§ 371 (c)(1),
(2) Date: Oct. 22, 2018

(87) PCT Pub. No.: WO2017/188493
PCT Pub. Date: Nov. 2, 2017

(65) Prior Publication Data
US 2019/0126225 A1 May 2, 2019

(30) Foreign Application Priority Data

Apr. 25, 2016 (KR) .................. 10-2016-0050252

(51) Int. Cl.
*B22C 5/00* (2006.01)
*B01F 35/75* (2022.01)
(Continued)

(52) U.S. Cl.
CPC .......... *B01F 35/751* (2022.01); *B01F 27/702* (2022.01); *B01F 35/00* (2022.01)

(58) Field of Classification Search
CPC combination set(s) only.
See application file for complete search history.

(56) References Cited

U.S. PATENT DOCUMENTS

RE22,002 E * 1/1942 Beken ..................... B01F 7/042
366/298
3,419,250 A * 12/1968 Brennan, Jr. ....... B01F 15/0267
366/196
(Continued)

FOREIGN PATENT DOCUMENTS

JP 2004033813 A 2/2004
KR 100377673 B1 5/2003
(Continued)

*Primary Examiner* — Anshu Bhatia
*Assistant Examiner* — Gregory Y Huan
(74) *Attorney, Agent, or Firm* — Tutunjian & Bitetto, P.C.

(57) ABSTRACT

The present disclosure relates to a stirrer for stirring a raw material such as flour or meat. Two rotating shafts are installed inside the stirrer such that stirring blades intersect with each other. The two rotating shafts are controlled to simultaneously rotate symmetrically or to rotate in the same direction, and the stirred raw material is discharged through a side surface of a stirring tank of the stirrer. The rotating shafts having the stirring blades formed thereon are connected to a driving means that can adjust the phase angle of the two shafts, via a position control device. The raw material is stirred while relative positions are adjusted such that the stirring blades formed on the two rotating shafts do not interfere with each other.

2 Claims, 5 Drawing Sheets

(51) Int. Cl.
*B01F 27/702* (2022.01)
*B01F 35/00* (2022.01)

(56) References Cited

U.S. PATENT DOCUMENTS

| | | | | |
|---|---|---|---|---|
| 5,727,876 A | * | 3/1998 | Tynan | B01F 7/08 366/100 |
| 2008/0078853 A1 | * | 4/2008 | Sugino | B01F 15/00785 241/260 |
| 2008/0095910 A1 | * | 4/2008 | Wenger | B01F 7/00425 426/557 |
| 2011/0112255 A1 | * | 5/2011 | Bierdel | B29C 48/507 525/316 |

FOREIGN PATENT DOCUMENTS

| | | |
|---|---|---|
| KR | 100803712 B1 | 2/2008 |
| KR | 100821236 B1 | 4/2008 |
| KR | 20100036118 A | 4/2010 |
| KR | 20110029797 A | 3/2011 |

* cited by examiner

STIRRER COMPRISING TWO ROTATING SHAFTS HAVING INTERSECTING STIRRING BLADES CAPABLE OF ROTATING SYMMETRICALLY AND ROTATING IN IDENTICAL DIRECTION AND STIRRING METHOD

BACKGROUND OF THE DISCLOSURE

Technical Field

The present disclosure relates to a stirrer for stirring raw materials such as wheat flour and meat and, more specifically, to a stirrer comprising two rotating shafts having intersecting stirring blades capable of rotating symmetrically and rotating in an identical direction, in which two rotating shafts are installed inside the stirrer such that stirring blades intersect with each other, the two rotating shafts are controlled to simultaneously rotate symmetrically or to rotate in the same direction, and the stirred raw materials are discharged through a side surface of the stirrer.

Background Art

In general, the stirrer includes one pair of rotating shafts installed in a stirring tank and having stirring blades, which are fixed at predetermined intervals and disposed to be mutually shifted, such that raw materials are mixed and stirred as the rotating shafts are rotated in the opposite directions each other.

The stirrers are classified into a stirrer having intersecting type stirring blades and a stirrer having non-intersecting type stirring blades depending on the installation method of the rotating shafts.

Figure 1A:
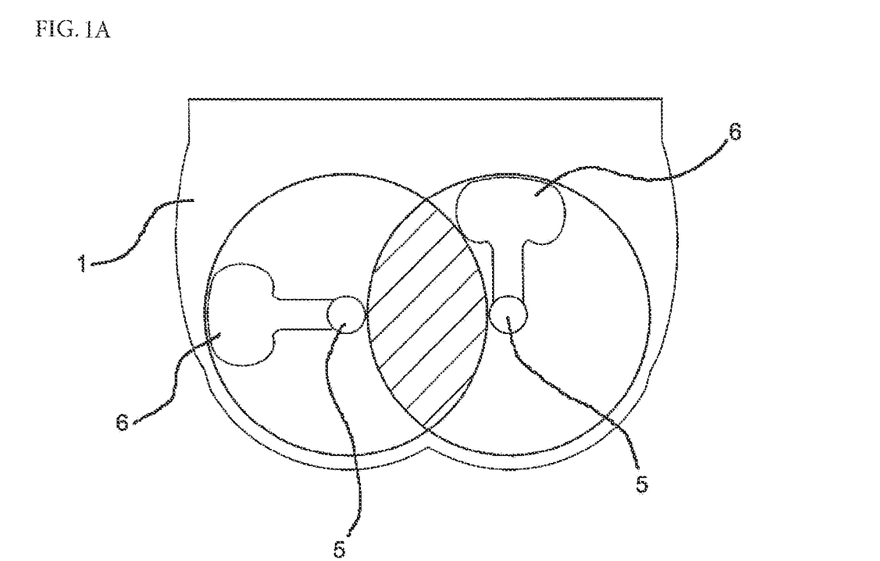
FIG. 1a is a schematic view showing a prior art stirrer having intersecting type stirring blades.

FIG. 1a is a schematic view showing a prior art stirrer having intersecting type stirring blades, in which rotating shafts 5 having stirring blades 6 are axially coupled in the center of a stirring tank 1 and the rotating shafts 5 protruding outside the stirring tank 1 are supported by bearings (not shown). According to this intersecting type stirring blades, the stirring blades 6 are rotated while overlapping each other in a hatched portion such that the raw materials are stirred and mixed.

In addition, one end of each of the rotating shafts 5 is connected to a driving unit 4 such that as the rotating shafts 5 and the stirring blades 6 are rotated by the operation of the driving unit 4, the rotating shafts 5 and the stirring blades 6 stir and mix the raw materials in the stirring tank 1 while generating the swirling flow or the upper and lower circulation flows.

By means of the stirrer having the intersecting type stirring blades, the raw materials are initially maintained in a non-uniformly mixed state in the stirring tank 1 depending on the specific gravity of the raw materials supplied and then uniformly mixed as a result of stirring and mixing for a long time.

In order to further improve the stirring and mixing operation, there have been developed and used stirrers with two rotating shafts 5 and stirring blades 6, which rotate while intersecting each other in a mixing tank 1.

However, in order to prevent the intersecting stirring blades 6 from colliding with each other due to the intersection during rotation, the prior art stirrer having such intersecting type stirring blades has a single rotation driving source such as a motor as a driving source and two rotating shafts 5 connected by means of a driving gear and a driven gear, wherein the two rotating shafts 5 are enabled to rotate in symmetrical directions as well as to carry out forward and backward rotations, thereby maximizing the mixing effect (the symmetrical directions means that the rotating directions of the two rotating shafts 5 are opposite to each other, the identical direction means that the rotating directions of the two rotating shafts 5 are in the same direction, and the forward rotation means the clockwise direction of the left rotating shaft in the drawings and the counterclockwise direction of the right rotating shaft).

The stirrer having the intersecting type stirring blades have the advantages that a uniform mixing effect can be obtained within a short time as a result of the intersection, thereby shortening the production time of the raw material (paste), and reduce the fatigue degree of the raw material, thereby providing the raw material of high quality.

However, the two rotating shafts 5 rotating in the opposite directions only allow the raw materials to be passed to each other or to be taken by each other while the stirring blades 6 face each other at the twisting angles thereof.

As for the rotating shafts 5 having the intersecting stirring blades 6, in the case where the twisting angle of the stirring blades 6 fixed on one of the rotating shafts 5 is set in the opposite direction of the angle of the stirring blades fixed on the other one such that the two rotating shafts 5 rotate in the symmetrical directions, the size of the stirring blades has to be reduced so as to prevent the stirring blades 6 fixed on the two rotating shafts 5 from interfering with each other and thus being disabled. Therefore, since the size of the stirring blades 6 has to be reduced inevitably, the raw material production capacity is lowered and the stirring time becomes longer.

Figure 2:
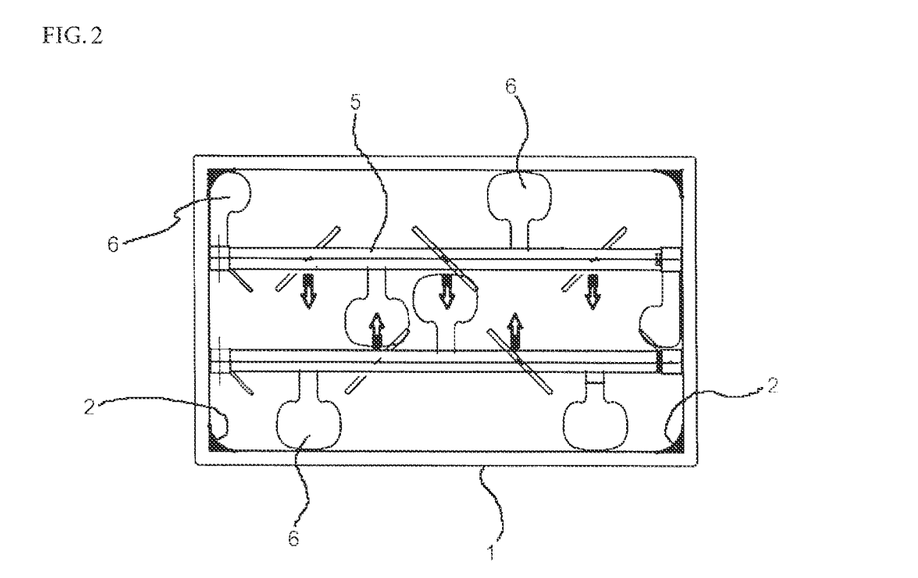
FIG. 2 is a plan view showing dead zones of a prior art stirrer.

In addition, there are the further problems that since the stirrer having the intersecting type stirring blades cannot move the raw materials in the directions of the rotating shafts 5, that is, to the side surfaces of the stirring tank 1 and thus cannot draw out the raw materials 2 from the corners of the stirring tank 1, the stirring process has to be carried out for a long time until the raw materials 2 in the dead zones of the stirring tank 1 as shown in FIG. 2 can escape from the dead zones and be mixed together by the friction due to the movement of the raw materials.

That is, about 95% of the total raw materials can be uniformly mixed in a short time, but the time required to mix the remaining raw materials of about 5% and the uniformly mixed raw materials of about 95% together is about five times longer than the time required to mix the raw materials of about 95%. Therefore, there is the fatal defect that the effect of the intersecting stirring blades cannot be fully achieved.

In addition, it is a further problem that the intersecting stirring blades rotate only in the symmetrical directions and this means that the intersecting stirring blades cannot carry out transfer in the axial direction and thus the raw materials cannot be discharged in the axial direction.

If the angles of the stirring blades are set such that the raw materials are transferred in one direction even in the symmetrical directions, the stirring blades inevitably interfere with each other and thus cannot operate.

Therefore, since the stirrer having the intersecting type stirring blades has a structure, in which the discharge of the raw materials can be carried out only in the direction of an upper lid that covers the stirring tank, a reversing device (not shown) for reversing the stirring tank has to be provided for discharging the mixed raw materials, which in turn disadvantageously results in the increase of the manufacturing costs of the stirrer and the prolongation of the discharge time of the raw materials.

Figure 1B:
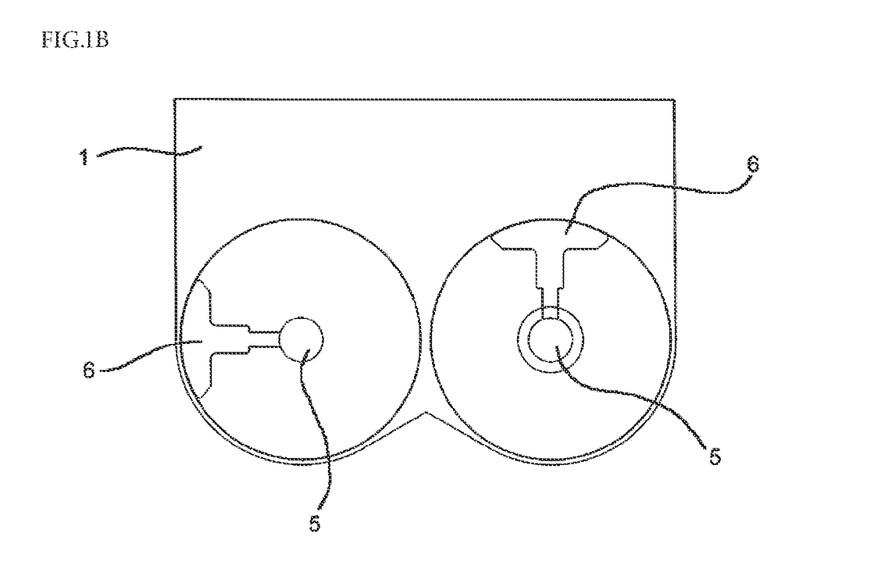
FIG. 1b is a schematic view showing a prior art stirrer having non-intersecting type stirring blades.

FIG. 1b is a schematic view showing a prior art stirrer having non-intersecting type stirring blades. Referring to FIG. 1b, since the rotating shafts 5 of this type of stirrer do not intersect, the stirring can be carried out by rotating stirring blades in symmetrical directions or identical directions but the stirring efficiency of raw materials is decreased due to the non-intersection of the rotating shafts.

That is, as shown in FIG. 1b, since the intersection ratio of the stirring blades 6 is 0%, the stirring effect is limited to the raw materials which rotate and come into contact with each other outside rotation outer diameters, so that the stirring effect is only about 1/20 of the intersecting stirring blades.

Consequently, the non-intersecting stirring blades are reduced in the size of the stirring blades and carry out stirring while moving parts of the raw materials in the axial direction (that is, leaving the parts of the raw materials and moving the same).

This type of stirrer has a structure of inherently deteriorating the stirring effect and the raw materials on the opposite rotating shafts do not mixed with each other.

Of course, such a stirrer having the non-intersecting type stirring blades has the advantages that the two rotating shafts do not intersect with each other such that it is possible to realize combinations of various rotating directions such as 1) symmetrical, 2) identical, 3) clockwise, and 4) counterclockwise directions, and the raw materials can be transferred to one side surface so as to be prevented from remaining in the side corners without being stirred as the raw materials in the stirrer having intersecting type stirring blades. However, the stirrer having the non-intersecting type stirring blades still has the problem that the stirring effect is deteriorated.

Figure 3:
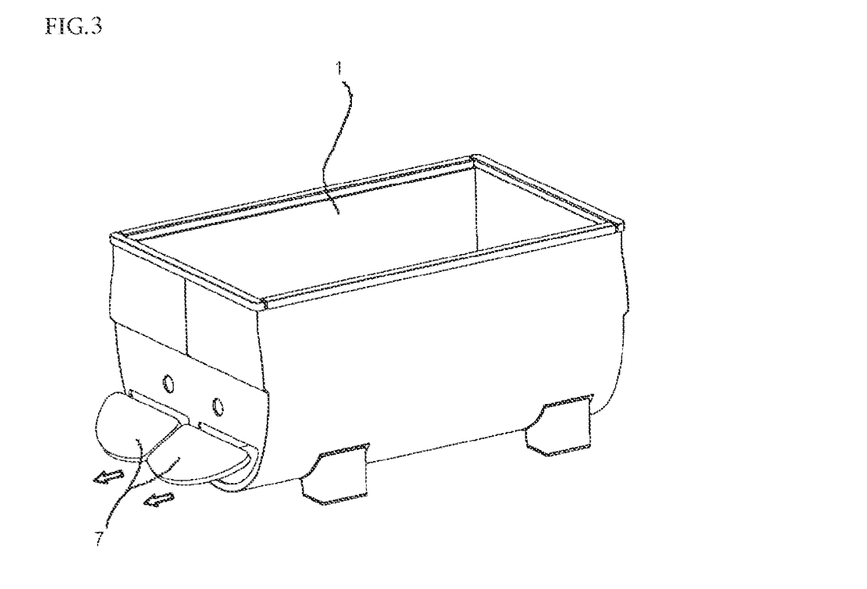
FIG. 3 is a perspective view showing a prior art stirrer, in which a raw material discharge hole is formed in the lower portion of a side surface.

However, as described above, both the two rotating shafts can transfer the raw materials to a side surface such that the stirrer having the non-intersecting stirring blades can discharge the raw materials through the side surface. Accordingly, if a discharge cover 7 is provided to the side surface of the stirring tank 1 so as to be opened or closed such that the raw materials of which mixing has been finished can be discharged, as shown in FIG. 3, then no reversing device of the stirring tank 1 is required and thus the manufacturing costs of this stirrer can be saved compared with that of the stirrer having intersecting type stirring blades.

PRIOR ART DOCUMENTS

[Patent Document 0001] Korean Patent Laid-Open Publication No. 10-2011-0091267 (Published on 11 Aug. 2011)
[Patent Document 0002] Korean Registered Patent Publication No. 10-1529948 (Registered on 12 Jun. 2015)

DETAILED DESCRIPTION OF THE DISCLOSURE

Technical Problem

Accordingly, the present disclosure has been made in an effort to solve the above-mentioned problems and disadvantages occurring in the prior arts and has an objective to provide a stirrer having intersecting type stirring blades, in which a driving means that can adjust the phase angle of two shafts is provided to rotating shafts and connected to a position control device so as to enable all the rotational motion of non-intersecting type stirring blades such that basic mixing process is carried out by rotating the two rotating shafts in symmetrical directions in the manner of the intersecting type stirring blades and the two rotating shafts also rotate in identical directions intermittently, thereby drawing out the raw materials in the side corners of a stirring tank or evenly mix the raw materials on the whole.

The present disclosure has another objective to enable two rotating shafts to rotate in the clockwise or counterclockwise direction when the two rotating shafts are rotated in an identical direction or in the opposite directions such that it is possible to eliminate any dead point, where no stirring is carried out, to reduce the defects in the post-process caused by the raw materials that has not been stirred, and to minimize the area where the stirring efficiency is low, thereby largely reducing the stirring time.

The present disclosure has a further objective to move raw materials in the axial direction while rotating two rotating shaft in a same direction such that it is possible to discharge the raw materials through an opening formed in a side surface of a stirring tank, thereby reducing the discharge time of the raw materials and simultaneously reducing the fatigue of workers during the raw material discharge.

Technical Solution

According to one aspect of the present disclosure to achieve the above objectives, in a stirrer, in which rotating shafts having stirring blades are installed inside a stirring tank and are connected to a driving means provided outside the stirring blades, the stirring blades are driven by power from the rotating shafts and constitute a pair, and the radii of rotation of the stirring blades intersect and interfere with each other during rotation, there is provided a stirrer comprising two rotating shafts having intersecting stirring blades capable of rotating symmetrically and rotating in an identical direction, characterized in that the rotating shafts having the stirring blades formed thereon are connected to a driving means that can adjust the phase angle of the two shafts, the driving means is connected to a position control device, and raw materials are stirred while the relative positions of the stirring blades are adjusted such that the stirring blades formed on the two rotating shafts do not interfere with each other.

According to another aspect of the present disclosure to achieve the above objectives, there is provided a stirring method of a stirrer comprising two rotating shafts having intersecting stirring blades capable of rotating symmetrically and rotating in an identical direction, comprising providing a driving means for adjusting a phase angle of two shafts to one pair of rotating shafts, which have stirring blades formed at predetermined intervals and are mounted in parallel to each other, so as to control the rotating directions of the rotating shafts by means of a position control device, and, when mixing raw materials, repetitively carrying out stirring the raw materials by rotation in symmetrical directions by setting the phase angle of the stirring blades to 70°-110° or 160°-200° and then stirring the raw materials by rotation in the same direction by setting the phase angle of the stirring blades to 10° or less by means of the position control device at every set time.

Advantageous Effects

Therefore, according to the present disclosure, a stirring tank has two rotating shaft in parallel to each other and the two rotating shafts can rotate in the same direction or in different directions from each other in each case of rotation in the same direction and rotation in the opposite directions such that it is possible to eliminate any area where no stirring is carried out so as to reduce the defects in the post-process caused by the raw materials that have not been stirred and to minimize any area where the stirring efficiency is low, thereby reducing the whole stirring time.

In addition, since the two rotating shafts are rotated in the same direction such that the raw materials can be moved in the axial direction of the stirring tank and thus discharged through a raw material discharge hole formed in the lower portion of a side surface of the stirring tank, the discharge time of the raw materials can be reduced and the fatigue of workers caused by the raw material discharge can be reduced at the same time, thereby reducing bacterial growth and thus implementing the Hazard Analysis and Critical Control Point HACCP, a high standard of food safety management certification and the like.

BRIEF EXPLANATION OF REFERENCE SYMBOLS

| | |
|---|---|
| 1: stirring tank | 2: raw materials |
| 4: driving means | 5: rotating shafts |
| 6: stirring blades | 7: discharge cover |
| 8: raw material discharge hole | |
| 9: position control device | |

BEST MODE FOR CARRYING OUT THE DISCLOSURE

Reference will now be made in detail to embodiments of the present disclosure with reference to the accompanying drawings so that it can be readily carried out by a person skilled in the art to which the present disclosure belongs. The present disclosure may be embodied in many different forms and is not limited to the embodiments described herein. The drawings are schematic and illustrate that they are not shown to scale. The relative dimensions and ratios of the parts in the figures are exaggerated or reduced in size for clarity and convenience in the figures, and any dimensions are merely illustrative and not restrictive. In addition, to the same structures, elements or parts appearing in more than one drawing, the same reference symbols are used to denote similar features.

Figure 4A:
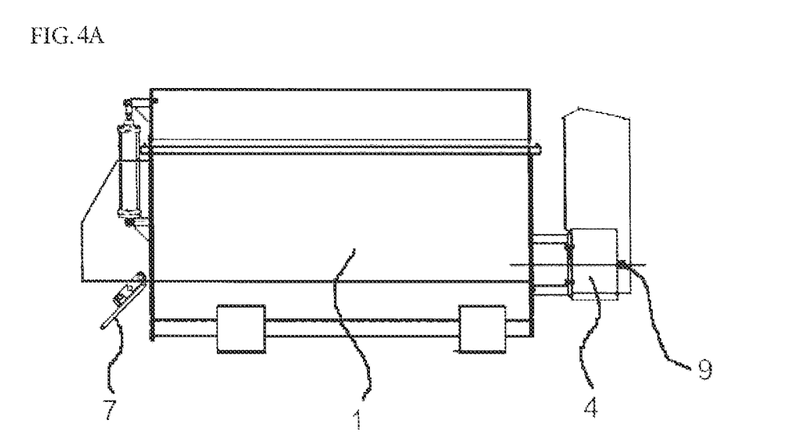
FIG. 4a is a front view showing a stirrer according to the present disclosure.
Figure 4B:
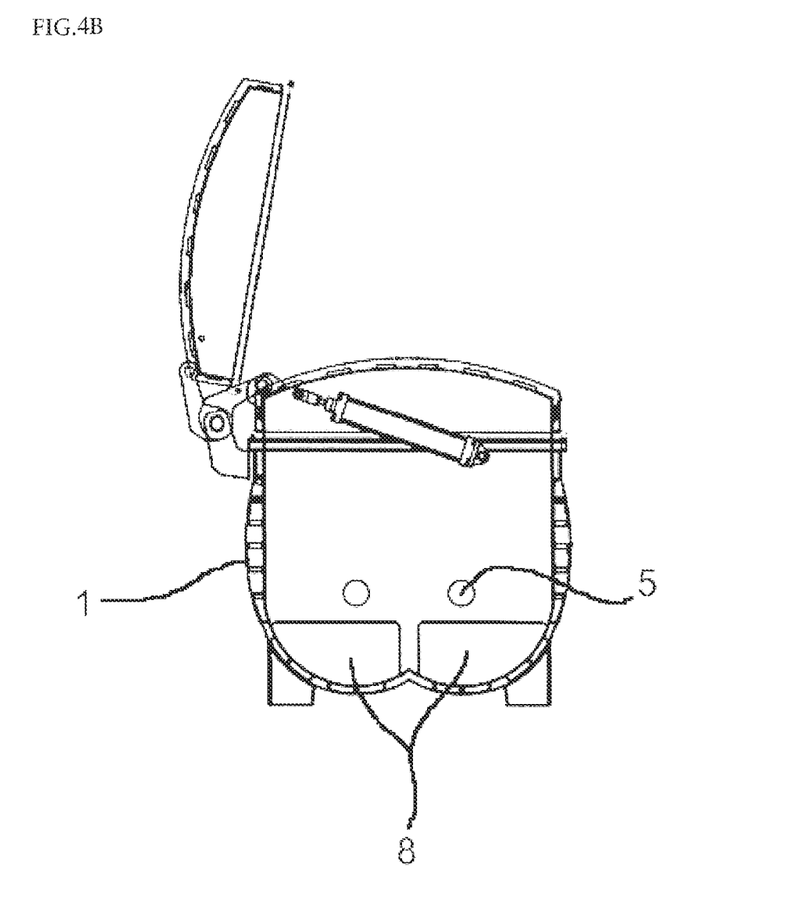
FIG. 4b is a cross-sectional view of the stirrer shown in FIG. 4a, FIG. 5a to FIG. 5c are conceptual diagrams showing the rotation in identical directions in the present disclosure.
Figure 5A:
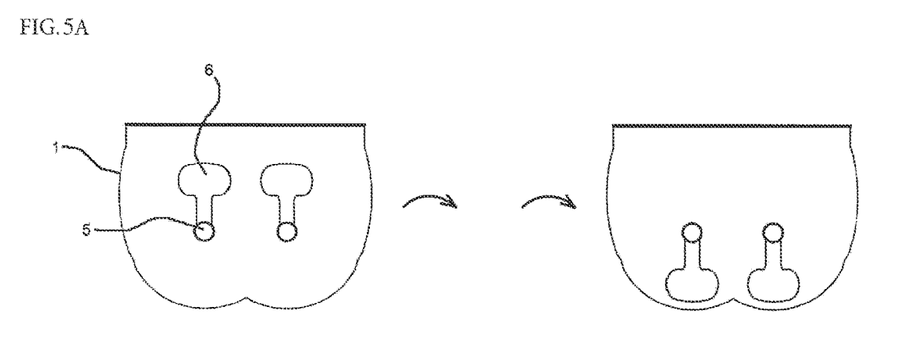
Figure 5B:
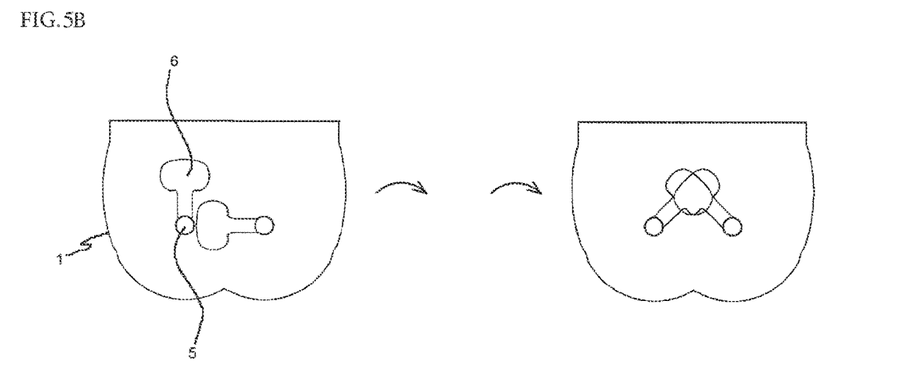
Figure 5C:
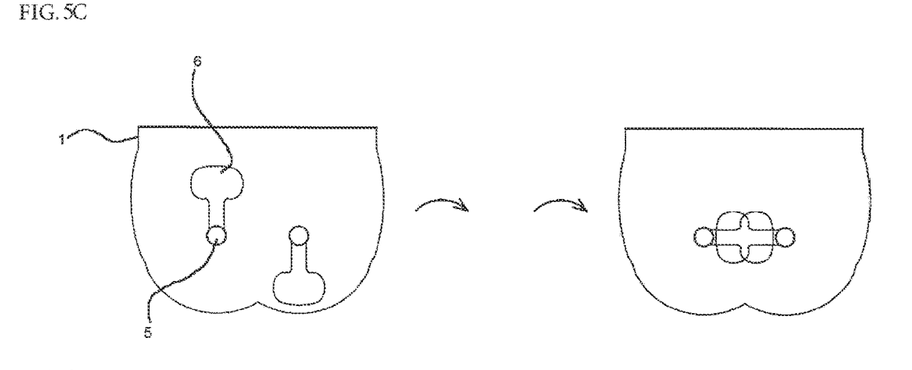
Figure 6A:
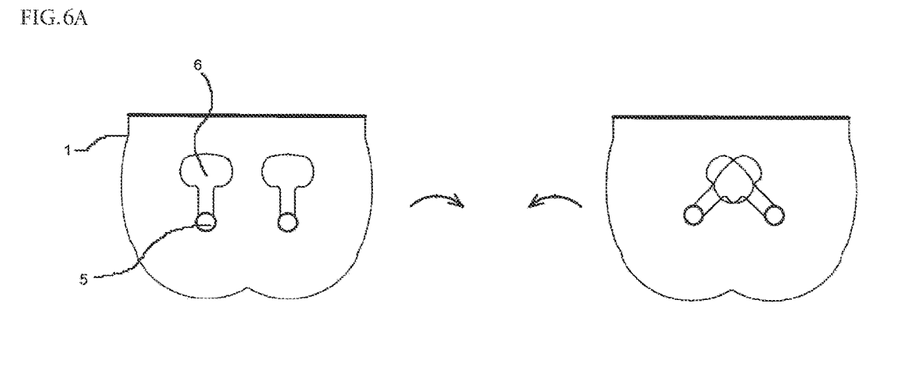
FIG. 6a to FIG. 6c are conceptual diagrams showing the rotation in symmetrical directions in the present disclosure.
Figure 6B:
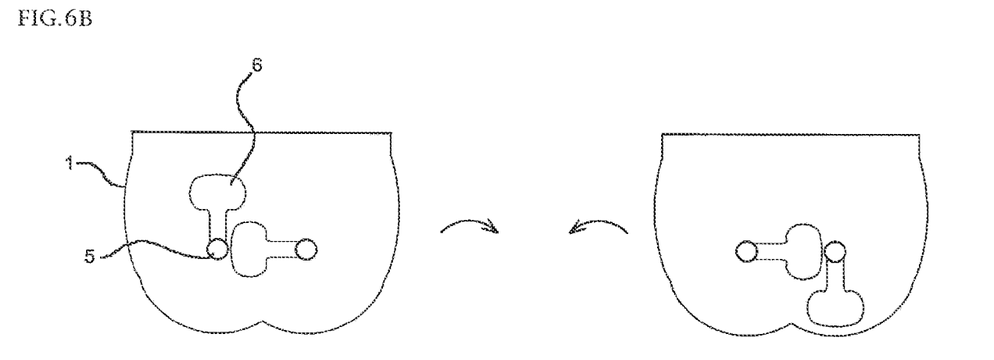
Figure 6C:
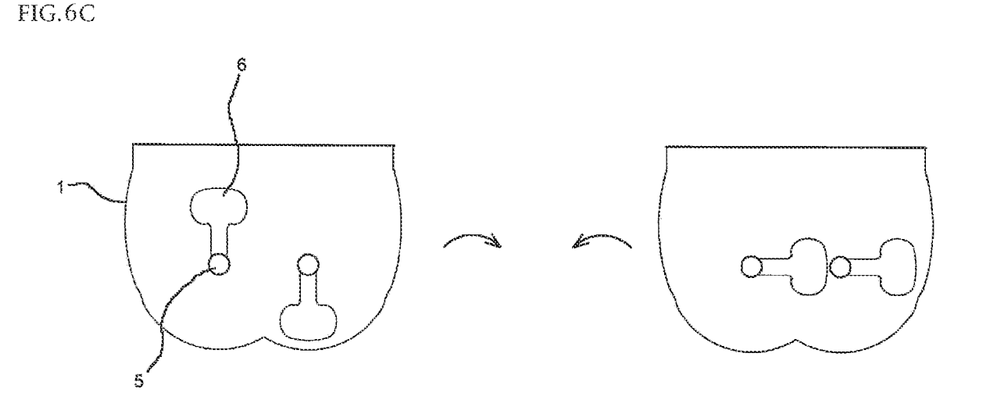

FIG. 4 show cross-sectional views of a stirrer according to the present disclosure, FIG. 5a to FIG. 5c are conceptual diagrams showing the rotation in identical directions in the present disclosure, and FIG. 6a to FIG. 6c are conceptual diagrams showing the rotation in symmetrical directions in the present disclosure. The stirring tank 1 according to the present disclosure includes rotating shafts 5 mounted therein and having stirring blades 6, the rotating shafts having the stirring blades 6 are connected to a driving means 4 which can adjust the phase angle of the two shafts, and the driving means 4 is connected to a position control device 9 such that the relative positions of the stirring blades 6 can be controlled by the position control device 9 and the stirring blades 6 formed on the two rotating shafts 5 can stir raw materials 2 without interfering with each other.

Therefore, the raw materials 2 can be mixed while driving the stirring blades 6 to rotate in symmetrical directions or in an identical direction by using the position control device 9.

It will be appreciated that the position control device 9 may be adopted in any of electrical, electronic, or mechanical ways.

Furthermore, a raw material discharge hole 8 is formed in the lower portion of a side surface of the stirring tank so as to be opened or closed, wherein the raw material discharge hole 8 is opened or closed by means of a discharge cover 7 such that at the final stage of the mixing of the raw materials 2, the raw materials 2 are mixed by the rotation in an identical direction and thus mixed raw materials 2 can be discharged through the raw material discharge hole 8 without reversing the stirring tank 1.

Figure 7:
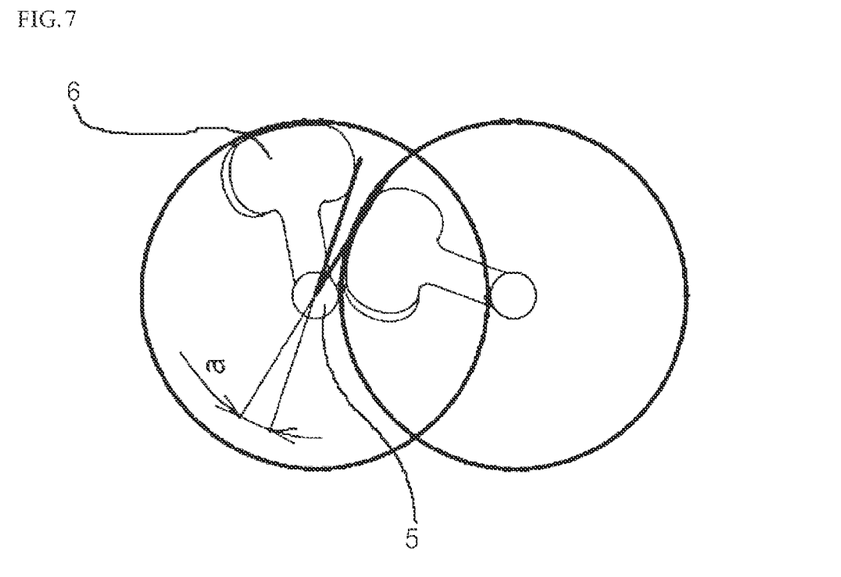
FIG. 7 is a view illustrating an allowable interference margin angle "a" according to the area (size) of stirring blades in the present disclosure.

FIG. 7 is a view illustrating an interference margin angle "a", which is allowable according to the area (size) of the stirring blades in the present disclosure, wherein a non-interference space between the stirring blades 6 can vary depending on the area and the intersection ratio of the stirring blades 6 (the interference ratio of the area intersected by the two stirring blades), but it would be preferable that the non-interference area is minimized since the larger the areas of the stirring blades 6, that is, the wider the space occupied by the rotation, the better the stirring efficiency.

For example, if the non-interference space is designed to cover a range of 5° as shown by "a" in FIG. 7 (that is, if an intersection and interference space ranges 85°, the stirring effect of 85/90=94.4% can be obtained per revolution in theory), the required precision of the phase angle of the intersecting stirring blades is 5° and thus precise control within 5° is required.

If an interval between the stirring blades 6 disposed on either one of the rotating shafts 5 is wide or the width or outer diameter of the stirring blades 6 is small, the stirring blades 6 of the one rotating shaft 5 does not interfere with the stirring blades of the other rotating shaft but the stirring efficiency is deteriorated. Therefore, this should be taken into account sufficiently when designing.

The following explains the operations of the present disclosure structured as above.

First, as the raw materials 2 to be mixed are put in the stirring tank 1 and power is supplied, since the phase angle of the stirring blades 6 is set to 70°-110° or 160°-200° such that the raw materials are stirred by rotation in symmetrical directions. The, at every set time, the phase angle of the stirring blades 6 is set to 10° or less by the position control device 9 such that the raw materials 2 are stirred by rotation in an identical direction. The stirring of the raw materials 2 by the rotation in symmetrical directions and the stirring of the raw materials 2 by the rotation in an identical direction are carried out repetitively.

As shown in FIG. 5a, if the phase angle is 0° during the mixing by the rotation in an identical direction, the stirring blades 6 do not interfere with each other and thus the stirring blades 6 do not collide with each other during the mixing of the raw materials.

However, as FIG. 5b or FIG. 5c, if the phase angle is 90° or 180°, the one pair of stirring blades 6 collide with each other and thus the stirring cannot be carried out.

Furthermore, as shown in FIG. 6a, if the phase angle is 0° during the mixing by the rotation in symmetrical directions, the stirring blades 6 collide with each other on the contrary to the case of the rotation in an identical direction. However, as shown in FIG. 6b or FIG. 6c, if the phase angle is 90° or 180°, the one pair of stirring blades 6 do not interfere with each other and thus the stirring blades 6 do not collide with each other during the mixing of the raw materials 2.

Herein, when the phase angle is 90°, if it is assumed that the area (size) of the stirring blade 6 is 1, the area of the stirring blade 6 should be gradually decreased as the phase angle becomes smaller or larger than 90° such that the stirring blades 6 are prevented from colliding with each other when the raw materials 2 are mixed by the rotation in symmetrical directions.

Therefore, it is preferable that the phase angle of the stirring blades 6 is set to 90° or 180° when the stirring is carried out in symmetrical directions while the phase angle of the stirring blades 6 is set to 0° when the stirring is carried out in a same direction, such that the areas of the stirring blades 6 can be maximized.

That is, if the driving means 4 drives the rotating shafts 5 to rotate in symmetrical directions under the control of the position control device 9 in a state, in which the areas of the stirring blades 6 are set to be maximum, the one pair of stirring blades 6, of which the phase angle is set to 70°-110° or 160°-200°, repetitively intersect each other and mix the raw materials 2, thereby maximizing the stirring efficiency.

Therefore, if the two rotating shafts 5 stir the raw materials 2 by rotation in symmetrical directions for a set time and then stir the raw materials 2 by rotation in an identical direction by the position control device 9, the raw materials 2 which are gathered in the corner portions of the stirring tank 1 and not mixed can be drawn out and then mixed, thereby exhibiting even mixing efficiency.

As the mixing of the raw materials 2 is completed in a short time by combination of the rotation in symmetrical directions and the rotation in an identical direction as described above, the discharge cover 7 is opened from the raw material discharge hole 8 in the lower portion of the side surface of the stirring tank 1 and the stirring blades 6 are finally rotated in an identical direction, such that the mixed raw material 2 can be discharged simply without reversing the stirring tank 1 itself.

While the embodiments of the present disclosure have been described with reference to the accompanying drawings, a person skilled in the art will recognize that the present disclosure can be embodied in other specific forms without departing from the spirit or essential characteristics thereof.

Therefore, it should be understood that the above-described embodiments are to be considered in all respects as illustrative and not restrictive, and the scope of the present disclosure described in the foregoing description is defined by the appended claims, and all equivalents or variations derived therefrom are to be construed as being included within the scope of the present disclosure.

What is claimed is:

1. A stirrer comprising:
   two rotating shafts having intersecting stirring blades capable of rotating symmetrically and in the same direction with respect to each other;
   stirring blades formed on each of the rotating shafts and connected to a driving means that can relationally and independently adjust a phase angle of one or both of the two shafts, each of the stirring blades having a rotational path; and
   a position control device connected to the driving means such that a raw material is stirred while the relative positions of the stirring blades are adjusted such that the stirring blades formed on the two rotating shafts intersect with the rotational path of other stirring blades during operation and do not interfere with each other.

2. The stirrer according to claim 1, further comprising a stirring tank having a raw material discharge hole formed in a lower portion of a side surface of the stirring tank; and a discharge cover configured to open or close the raw material discharge hole.

* * * * *